US012794105B2

(12) United States Patent
Ayotte et al.

(10) Patent No.: US 12,794,105 B2
(45) Date of Patent: Nov. 10, 2026

(54) MECHANICALLY ADJUSTABLE ANTENNA POSITIONING SYSTEM

(71) Applicant: Antenna Research Associates, Inc., Laurel, MD (US)

(72) Inventors: Keith Ayotte, Hudson, NH (US); Sandeep Palreddy, Springfield, MA (US); Scott Weber, Westborough, MA (US); Tyler McSorley, Nashua, NH (US); Nicholas Keith, Stoughton, MA (US)

(73) Assignee: Antenna Research Associates, Inc., Laurel, MN (US)

( * ) Notice: Subject to any disclaimer, the term of this patent is extended or adjusted under 35 U.S.C. 154(b) by 0 days.

(21) Appl. No.: 18/438,777

(22) Filed: Feb. 12, 2024

(65) Prior Publication Data

US 2024/0186676 A1 Jun. 6, 2024

Related U.S. Application Data

(63) Continuation of application No. 17/534,971, filed on Nov. 24, 2021, now Pat. No. 11,909,096.

(Continued)

(51) Int. Cl.

*H01Q 3/02* (2006.01)
*H01Q 1/12* (2006.01)
*H01Q 19/13* (2006.01)

(52) U.S. Cl.

CPC ......... *H01Q 1/1264* (2013.01); *H01Q 1/1257* (2013.01); *H01Q 3/02* (2013.01); *H01Q 19/134* (2013.01)

(58) Field of Classification Search

None

See application file for complete search history.

(56) References Cited

U.S. PATENT DOCUMENTS

| | | | | |
|---|---|---|---|---|
| 2,881,435 A | | 4/1959 | Butler | |
| 4,562,441 A | * | 12/1985 | Beretta | H01Q 1/288 343/781 P |

(Continued)

FOREIGN PATENT DOCUMENTS

| | | |
|---|---|---|
| CN | 201838708 U | 5/2011 |
| EP | 3480885 A1 | 5/2019 |
| JP | 2002-299940 A | 10/2002 |

OTHER PUBLICATIONS

Manufacture Definition & Meaning , Retrieved from Merriam-Webster website on Apr. 22, 2025 https://www.merriam-webster.com/dictionary/manufacture (Year: 2025).*

*Primary Examiner* — Dameon E Levi
*Assistant Examiner* — Anh Ho
(74) *Attorney, Agent, or Firm* — DLA Piper LLP (US)

(57) ABSTRACT

An adjustable antenna positioning system feed is disclosed herein. The adjustable antenna positioning system feed includes a feed base, a splash plate assembly, and a feed insert. The feed base is configured to be coupled to a reflector. The splash plate assembly is configured to be removably coupled to the feed base. The adjustable antenna positioning system feed is in a primary arrangement when directly coupled. The feed insert is positioned between the feed base and the splash plate. The adjustable antenna positioning system feed is in a secondary arrangement when the feed insert is coupled with the feed base and the splash plate.

19 Claims, 6 Drawing Sheets

Related U.S. Application Data

(60) Provisional application No. 63/118,492, filed on Nov. 25, 2020.

(56) References Cited

U.S. PATENT DOCUMENTS

| | | | | |
|---|---|---|---|---|
| 6,037,913 | A * | 3/2000 | Johnson | H01Q 1/1221 343/890 |
| 6,166,700 | A | 12/2000 | Jenkin et al. | |
| 10,418,712 | B1 | 9/2019 | Henderson et al. | |
| 10,622,725 | B2 | 4/2020 | Barratt et al. | |
| 10,847,892 | B2 * | 11/2020 | Pla | H01Q 1/125 |
| 2007/0075909 | A1 * | 4/2007 | Flynn | H01Q 19/132 343/840 |
| 2015/0061956 | A1 | 3/2015 | Yano | |
| 2018/0294543 | A1 * | 10/2018 | Barratt | H01Q 15/16 |

* cited by examiner

MECHANICALLY ADJUSTABLE ANTENNA POSITIONING SYSTEM

FIELD OF DISCLOSURE

The present disclosure generally relates to a mechanically adjustable antenna positioning system.

BACKGROUND

Antenna systems typically point an antenna toward a satellite in geosynchronous orbit above the earth to acquire signals emitted from the transponder of the satellite. Antenna systems typically include a dish or reflector and a feed or a feed horn. The reflector receives the signals broadcast from the satellite transponder and focuses them on a focal point where the feed is located.

SUMMARY

In some embodiments, an adjustable antenna positioning feed, is disclosed herein. The adjustable antenna positioning feed includes a feed base, a splash plate assembly, and a feed insert. The feed base is configured to be coupled to a reflector. The splash plate assembly is configured to be removably coupled to the feed base. The adjustable antenna positioning feed is in a primary arrangement when directly coupled. The feed insert is positioned between the feed base and the splash plate. The adjustable antenna positioning feed is in a secondary arrangement when the feed insert is coupled with the feed base and the splash plate.

In some embodiments, an adjustable antenna positioning feed is disclosed herein. The adjustable antenna positioning feed includes a feed base, a splash plate assembly, and a feed insert. The feed base is configured to be coupled to an antenna positioning reflector. The splash plate assembly is configured to be removably coupled to the feed base. The feed insert is positioned between the feed base and the splash plate. The feed insert is coupled with the feed base and the splash plate.

In some embodiments, an antenna positioning assembly is disclosed herein. The antenna positioning assembly includes a reflector and an adjustable antenna positioning feed. The adjustable antenna positioning feed is coupled with the reflector. The adjustable antenna positioning feed includes a feed base, a splash plate assembly, and a feed insert. The feed base is configured to be coupled to an antenna positioning reflector. The splash plate assembly is configured to be removably coupled to the feed base. The feed insert is positioned between the feed base and the splash plate. The feed insert is coupled with the feed base and the splash plate.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Conventionally, ground terminals that use a parabolic dish typically include a separate feed to accommodate various dish sizes. The feed (or feed horn) of the parabolic dish may be the focal point where the RF energy is concentrated on. This focal point varies based on the size and curvature of the dish.

An antenna or dish may refer to a component of a ground terminal that includes a feed. Those skilled in the art recognize, that the described functionality may be applied to a dish feed or, more broadly, an antenna feed.

Figure 1:
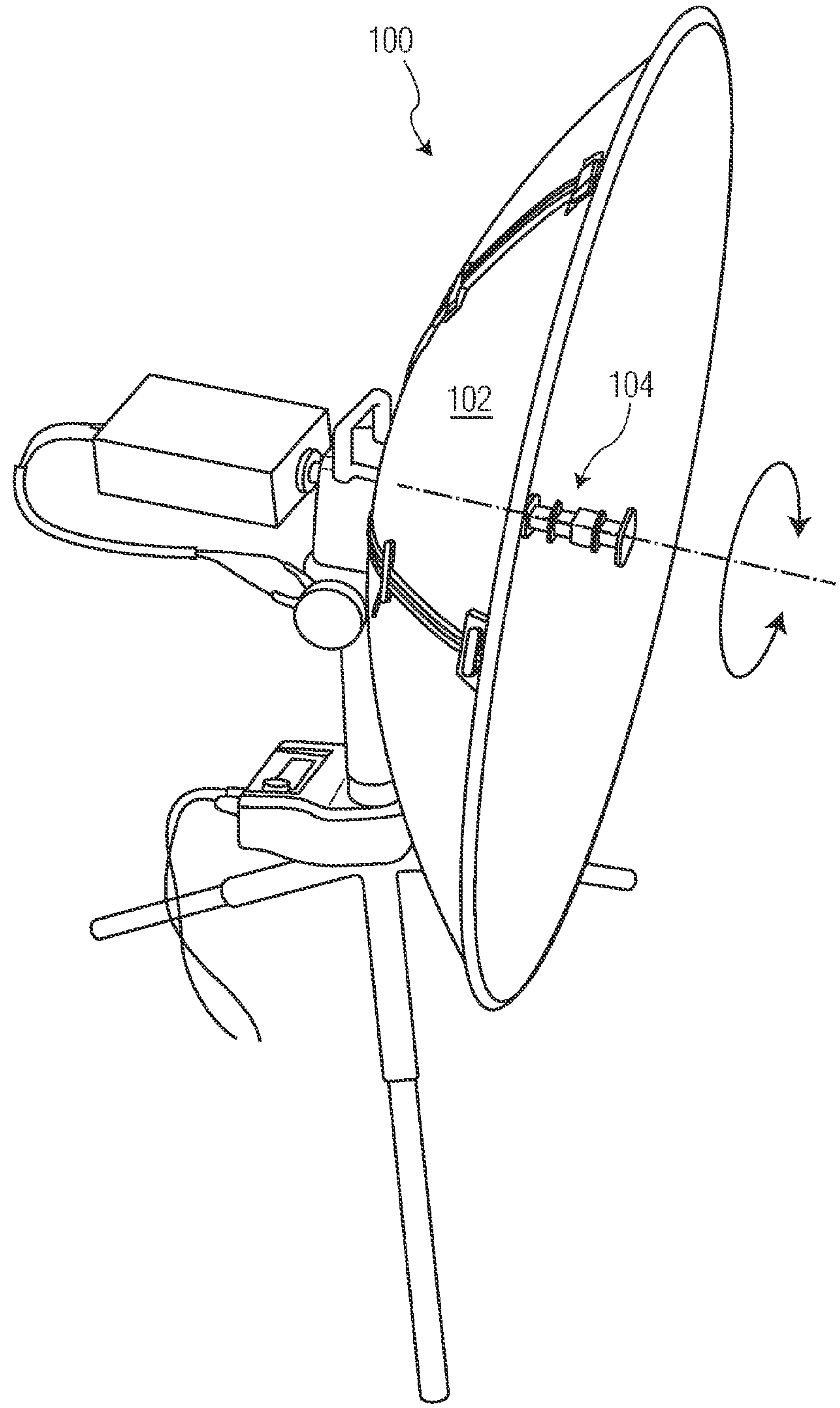
FIG. 1 illustrates an exemplary antenna positioning system, according to some embodiments.

FIG. 1 illustrates an exemplary antenna positioning system 100, according to example embodiments. As shown, antenna positioning system 100 may include at least a reflector 102 and a feed 104. Reflector 102 may be configured to receive or reflect electromagnetic waves. Generally, reflector 102 may be formed of a parabolic shaped body. Reflector 102 may be positioned around feed 104. Feed 104 may be positioned at a focal point of reflector 102. Feed 104 may be configured to receive electromagnetic waves transmitted to antenna positioning system 100 and/or transmit electromagnetic waves from antenna positioning system 100.

In some circumstances, an operator of antenna positioning system 100 may wish to change the size of reflector 102. For example, an operator may wish to maintain several sizes of reflectors 102 (e.g., 60 cm, 80 cm, 100 cm, 130 cm, etc.) and change the size or reflector 102 accordingly. Conventionally, in order to operate an antenna positioning system 100 properly with varying dimensions and or bands, an operator would need to purchase a new feed 104. This is because, in order for antenna positioning system 100 to operate properly, feed 104 may be positioned at the focal point of reflector 102. As such, once the size of reflector 102 changes, so does the focal point of reflector 102. Accordingly, in conventional systems, a different sized feed 104 is needed for each size of reflector 102.

The one or more embodiments described herein provides an improvement over conventional antenna positioning systems 100 by providing a mechanically adjustable feed that can be dynamically modified to account for changes in reflector size.

Figure 2A:
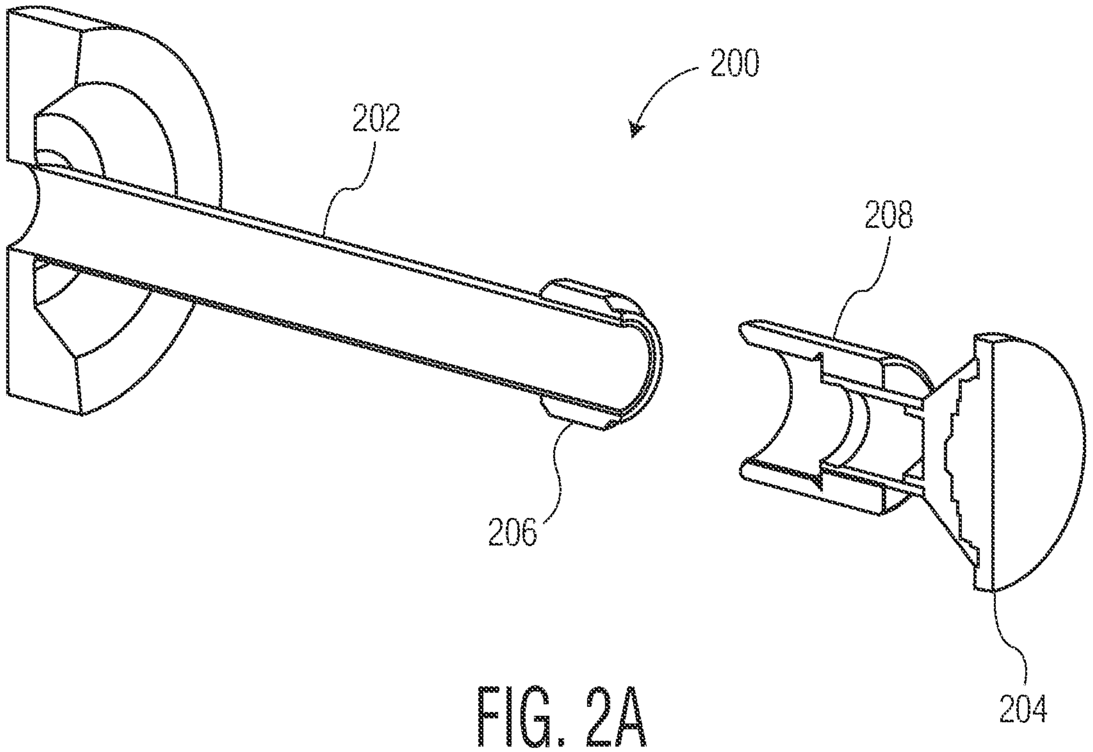
FIG. 2A illustrates an adjustable feed, according to example embodiments.
Figure 2B:
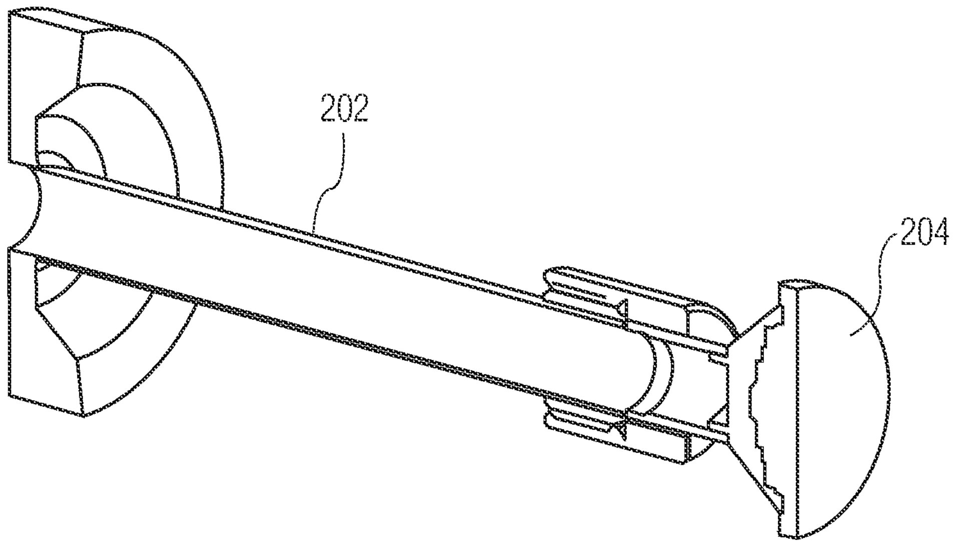
FIG. 2B illustrates an adjustable feed, according to example embodiments.

FIGS. 2A and 2B illustrate an adjustable feed 200, according to example embodiments. As shown, adjustable feed 200 may include a feed base 202 and a splash plate assembly 204. Feed base 202 may correspond to a component of adjustable feed 200 that may remain constant, regardless of the size of reflector (e.g., reflector 102) used in an antenna positioning system. In some embodiments, feed base 202 may be mounted in the center of the reflector.

In some embodiments, splash plate assembly 204 may be removably coupled with feed base 202. For example, feed base 202 may be removably coupled with splash plate assembly 204 via one or more coupling mechanisms 206 and 208. Splash plate assembly 204 may be configured to act as a feed horn for adjustable feed 200. Generally, each type of splash plate assembly 204 may be frequency dependent. For example, the size and shape of splash plate assembly 204 may define the operating frequency of an antenna positioning system. Because splash plate assembly 204 may be removed from feed base 202, adjustable feed 200 allows for different splash plate assemblies to be used based on a desired frequency for an antenna positioning system. Using a specific example, in an exemplary embodiment, an operator may utilize a first type of splash plate assembly 204 for an X band feed a second type of assembly for a Ka band feed, and a third type of assembly for a Ku band. In this manner, an operator can adjust the operating frequency of an antenna positioning system without replacing the entire feed assembly.

Figure 3A:
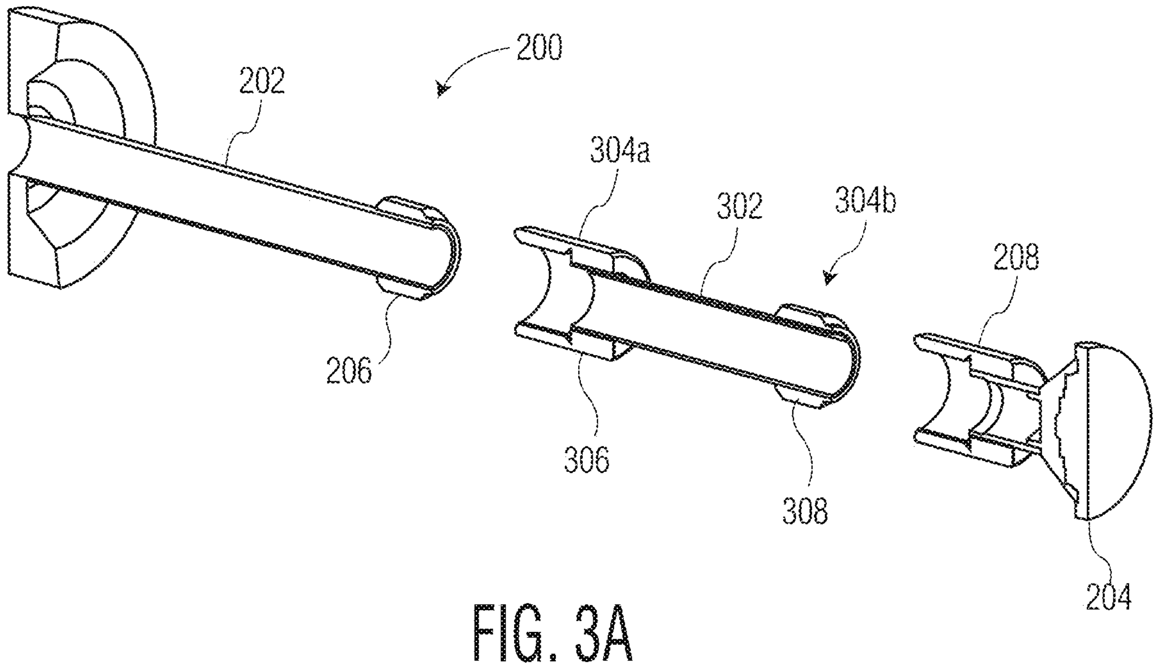
FIG. 3A illustrates an adjustable feed, according to example embodiments.
Figure 3B:
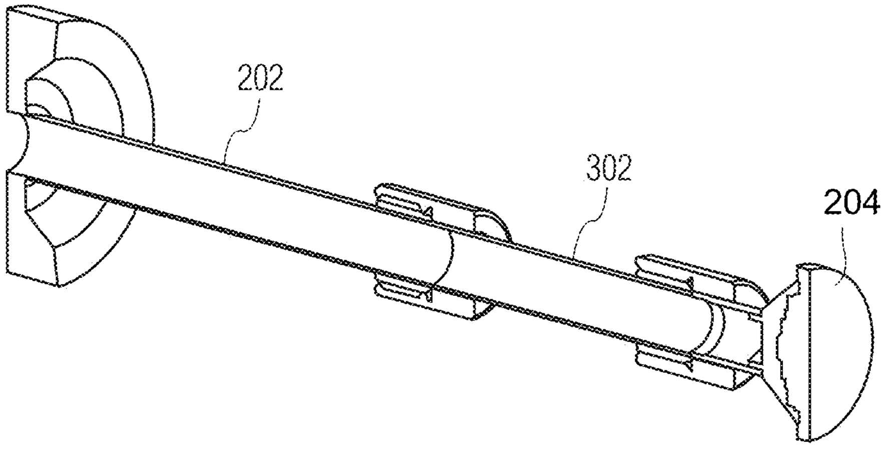
FIG. 3B illustrates an adjustable feed, according to example embodiments.

FIGS. 3A and 3B illustrate adjustable feed 200, according to example embodiments. In some embodiments, an operator of an antenna positioning system may wish to change a size of its reflector. For example, an operator of an antenna positioning system may wish to utilize a larger reflector. In this manner, the operator may need a longer feed in order to be correctly positioned at the new focal point. To account for this, adjustable feed 200 may further include a feed insert 302 having a first end 304*a* and a second end 304*b*.

In some embodiments, feed base 202 may be removably coupled with feed insert 302 at a first end 304*a* of feed insert 302. For example, feed base 202 may be removably coupled with feed insert 302 at first end 304*a* via coupling mechanisms 206 and 306. Feed insert 302 may be selectively added to adjustable feed 200 to change a length of adjustable feed 200. Continuing with the above example, feed insert 302 may be added to adjustable feed 200 to account for a new focal point.

To complete adjustable feed 200, feed insert 302 may be removably coupled with splash plate assembly 204 at second end 304*b*. For example, feed insert 302 may be removably coupled with splash plate assembly via coupling mechanisms 308 and 208.

Although FIGS. 3A and 3B are shown and discussed with respect to adding a single feed insert 302, those skilled in the art understand that multiple feed inserts 302 may be added to further extend a total length of adjustable feed 200. For example, multiple feed inserts 302 may positioned between feed base 202 and splash plate assembly 204 to account for varying focal points. Further, because adjustable feed 200 also allows for the interchanging of splash plate assemblies 204, depending on a desired operating frequency, adjustable feed 200 provides a dynamic feed for an antenna positioning system that can allow for both various sizes of reflectors (e.g., by adding or subtracting feed inserts 302) and various operating frequencies (e.g., by swapping out splash plate assemblies 204).

Figure 4:
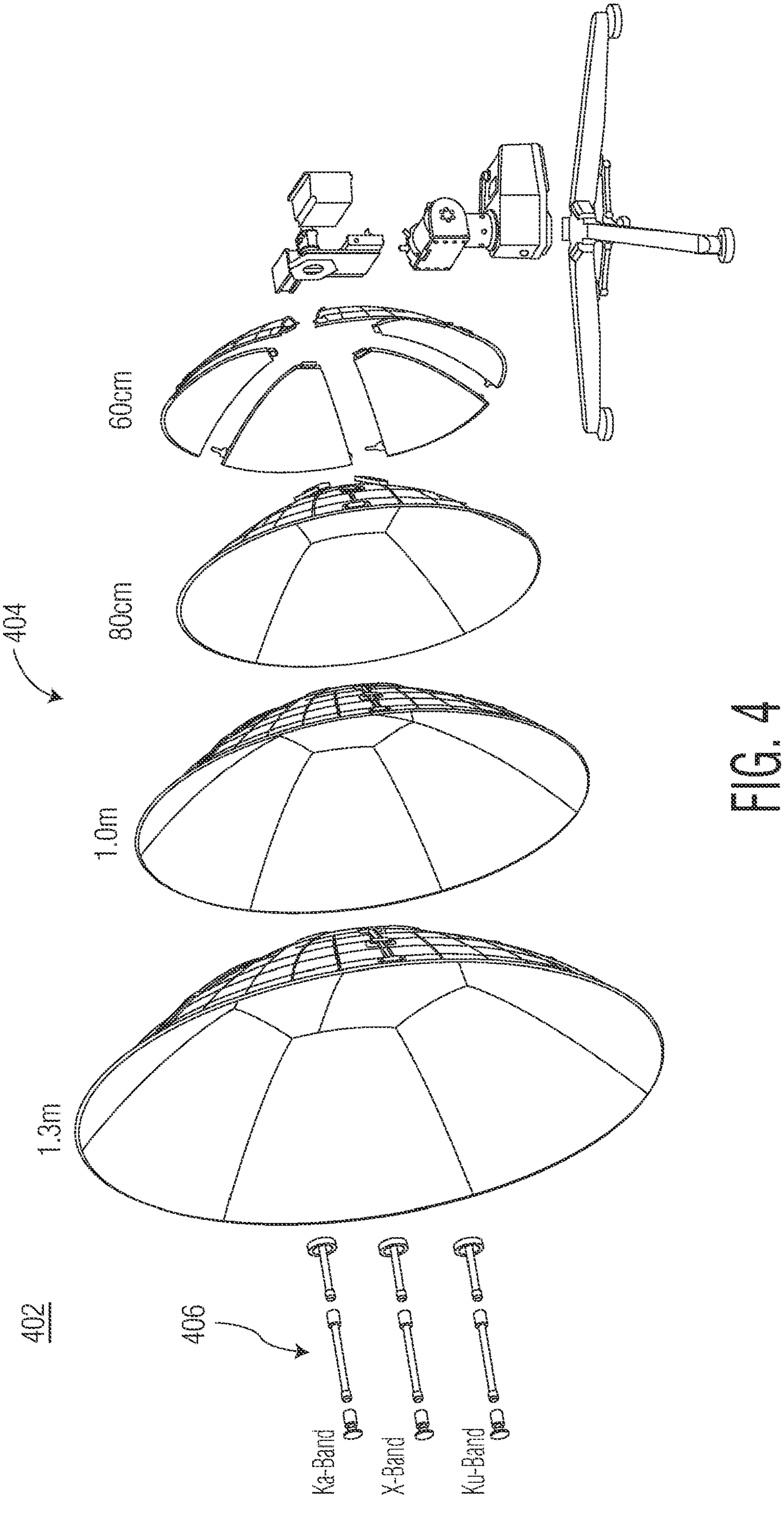
FIG. 4 illustrates various antenna positioning assemblies 402, according to example embodiments.

FIG. 4 illustrates various antenna positioning system 402, according to example embodiments. As shown, various antenna positioning systems 402 may include one or more reflectors 404 and one or more adjustable feeds 406. Each reflector 404 may correspond to a differently sized adjustable feed 406, depending on a focal point of each respective reflector 404. Similarly, each adjustable feed 406 may one or more feed inserts based on the focal point of each respective reflector 404. Further, each adjustable feed 406 may include a different splash plate assembly based on a desired operating frequency.

Figure 5A:
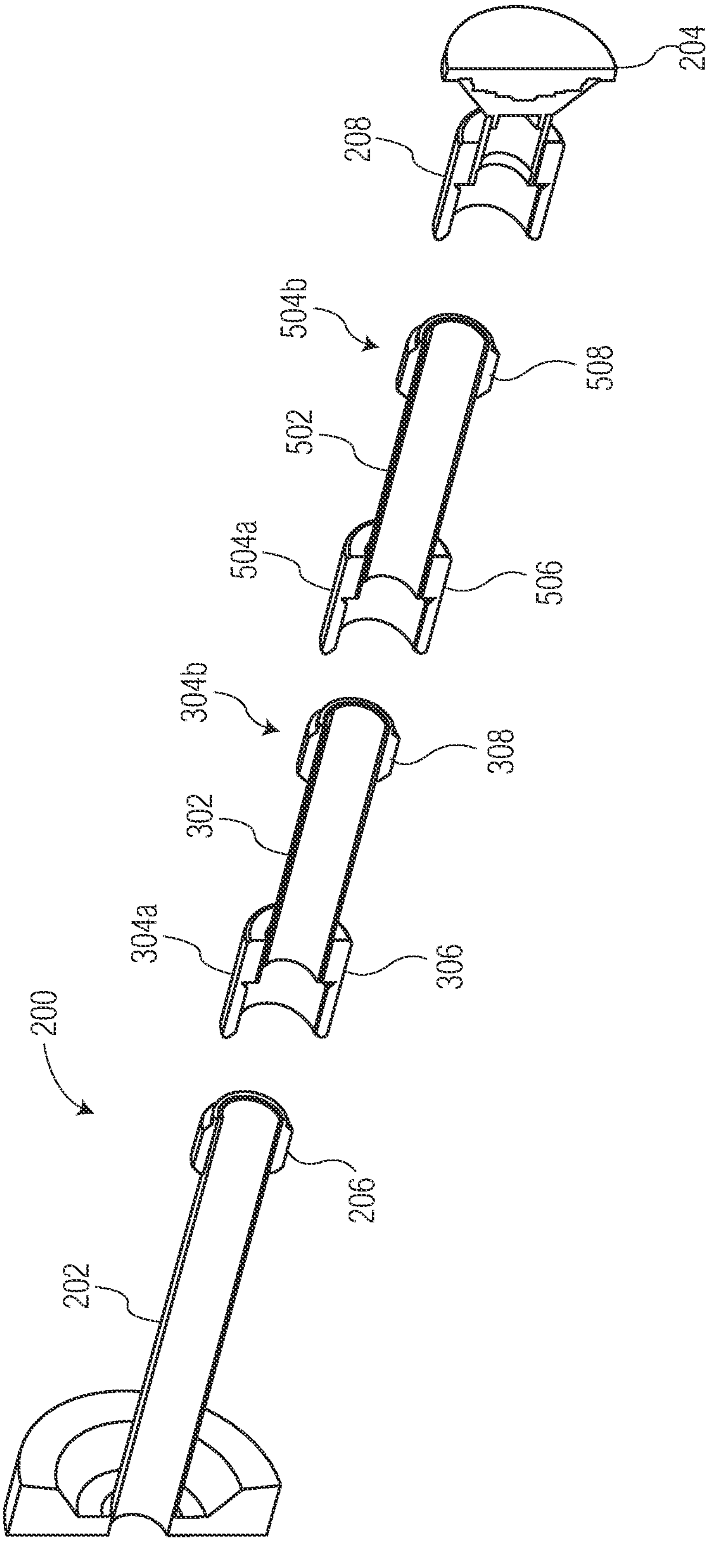
FIG. 5A illustrates an adjustable feed, according to example embodiments.
Figure 5B:
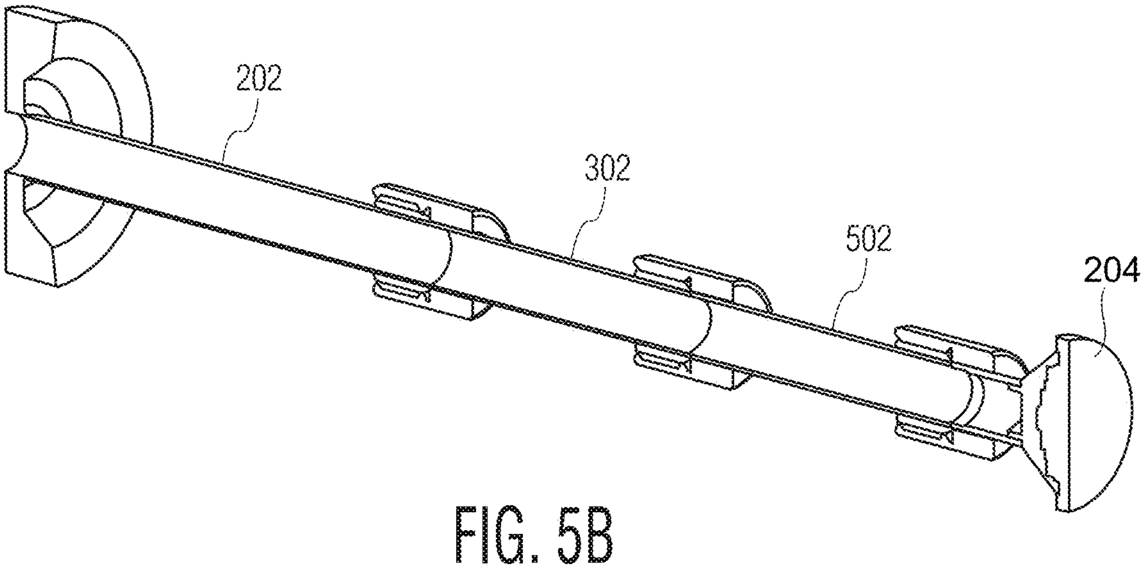
FIG. 5B illustrates an adjustable feed, according to example embodiments.

For example, FIGS. 5A and 5B illustrate second adjustable feed 200 with a further feed insert 502 positioned between feed base 202 and splash plate assembly 204, according to example embodiments. Further feed insert 502 may be configured similar to feed insert 302. For example, further feed insert 502 may include a first end 504*a* and a second end 504*b*. First end 504*a* of further feed insert 502 may interface with second end 304*b* of feed insert 302 via coupling mechanisms 308 and 508. Second end 504*b* of further feed insert 502 may interface with splash plate assembly 204 via coupling mechanisms 208 and 508.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. An antenna positioning system kit for forming an antenna positioning system, the antenna positioning system kit comprising:
- a plurality of reflectors, each reflector of the plurality of reflectors having a differently sized parabolic shaped body;
- a plurality of splash plates, each of the plurality of splash plates having a differing size and shape based on a desired frequency of the antenna positioning system; and
- a plurality of feed inserts, wherein one or more of the plurality of feed inserts are positionable between a chosen reflector and a chosen splash plate from the antenna positioning system kit, wherein a number of feed inserts selected for use with a chosen reflector from the plurality of reflectors is based on a diameter of the chosen reflector,
- wherein the antenna positioning system is formed from the antenna positioning system kit based on the chosen reflector, the chosen splash plate, and the one or more of the plurality of feed inserts.

2. The antenna positioning system kit of claim 1, wherein the chosen reflector is a first reflector having a first diameter, and wherein a first number of feed inserts from the plurality of feed inserts is selected to interface between the first reflector of the plurality of reflectors and a first splash plate of the plurality of splash plates based on the first diameter.

3. The antenna positioning system kit of claim 2, wherein the first number of feed inserts from the plurality of feed inserts comprises at least a first feed insert and a second feed insert.

4. The antenna positioning system kit of claim 1, wherein the plurality of splash plates comprises:
- a first splash plate dedicated to an X-band feed;
- a second splash plate dedicated to a Ka-band feed; and
- a third splash plated dedicated to a Ku-band feed.

5. The antenna positioning system kit of claim 1, wherein the plurality of reflectors comprises:
- a first reflector having a first diameter; and
- a second reflector having a second diameter larger than the first diameter.

6. The antenna positioning system kit of claim 5, wherein the plurality of feed inserts comprises:

a first set of feed inserts from the plurality of feed inserts to account for a first focal point of the first reflector; and a second set of feed inserts from the plurality of feed inserts to account for a second focal point of the second reflector, wherein a total length of the second set of feed inserts is greater than a total length of the first set of feed inserts.

7. The antenna positioning system kit of claim 1, wherein the number of feed inserts of the plurality of feed inserts are selected such that a combined length of the number of feed inserts positions the chosen splash plate at the focal point of the chosen reflector.

8. The antenna positioning system kit of claim 1, wherein the chosen splash plate of the plurality of splash plates is configured to be directly coupled to at least one feed insert from the plurality of feed inserts.

9. The antenna positioning system kit of claim 1, further comprising:

a coupling mechanism configured to couple a first feed insert from the plurality of feed inserts to a second feed insert from the plurality of feed inserts or the first feed insert to a first splash plate of the plurality of splash plates.

10. A method of forming an antenna positioning system comprising:

identifying a first reflector from a plurality of reflectors included in an antenna positioning system kit, the first reflector having a first desired diameter;

identifying a first splash plate from a plurality of splash plates included in the antenna positioning system kit, the first splash plate dedicated to a first desired frequency;

determining a number of feed inserts from a plurality of feed inserts included in the antenna positioning system kit for positioning the first splash plate at a focal point of the first reflector; and forming the antenna positioning system by coupling the first reflector to the first splash plate using the determined number of feed inserts.

11. The method of claim 10, wherein the determined number of feed inserts is one.

12. The method of claim 11, wherein forming the antenna positioning system by coupling the first reflector to the first splash plate using the determined number of feed inserts comprises:

coupling a first end of a first feed insert to the first reflector and a second end of the first feed insert to the first splash plate.

13. The method of claim 10, wherein the determined number of feed inserts is greater than one.

14. The method of claim 13, wherein forming the antenna positioning system by coupling the first reflector to the first splash plate using the determined number of feed inserts comprises:

coupling a first end of a first feed insert to the first reflector and a second end of the first feed insert to a first end of a second feed insert; and coupling a second end of the second feed insert to the first splash plate.

15. The method of claim 10, wherein forming the antenna positioning system by coupling the first reflector to the first splash plate using the determined number of feed inserts comprises:

determining the first desired frequency of the antenna positioning system; and selecting the first splash plate from the plurality of splash plates that comprises:

a second splash plate dedicated to an X-band feed;

a third splash plate dedicated to a Ka-band feed; and a fourth splash plated dedicated to a Ku-band feed.

16. The method of claim 10, further comprising:

determining that a desired frequency of the antenna positioning system has changed from the first desired frequency to a second desired frequency; and based on the determining, replacing the first splash plate with a second splash plate from the plurality of splash plates, the second splash plate associated with the second desired frequency.

17. The method of claim 10, further comprising:

determining that a desired size of a reflector has changed;

replacing the first reflector with a second reflector that has a second desired diameter greater than the first desired diameter; and based on the second desired diameter, adding at least one feed insert from the plurality of feed inserts to the number of feed inserts to account for the second desired diameter.

18. The method of claim 10, further comprising:

determining that a desired size of a reflector has changed;

replacing the first reflector with a second reflector that has a second desired diameter less than the first desired diameter; and based on the second desired diameter, removing at least one feed insert from the number of feed inserts to account for the second desired diameter.

19. The method of claim 10, wherein the antenna positioning system comprises a coupling mechanism configured to couple a feed insert from the determined number of feed inserts to the first splash plate.

* * * * *